Nov. 20, 1934.  M. GENTZLER  1,981,726
TIRE CHAIN
Filed June 15, 1934
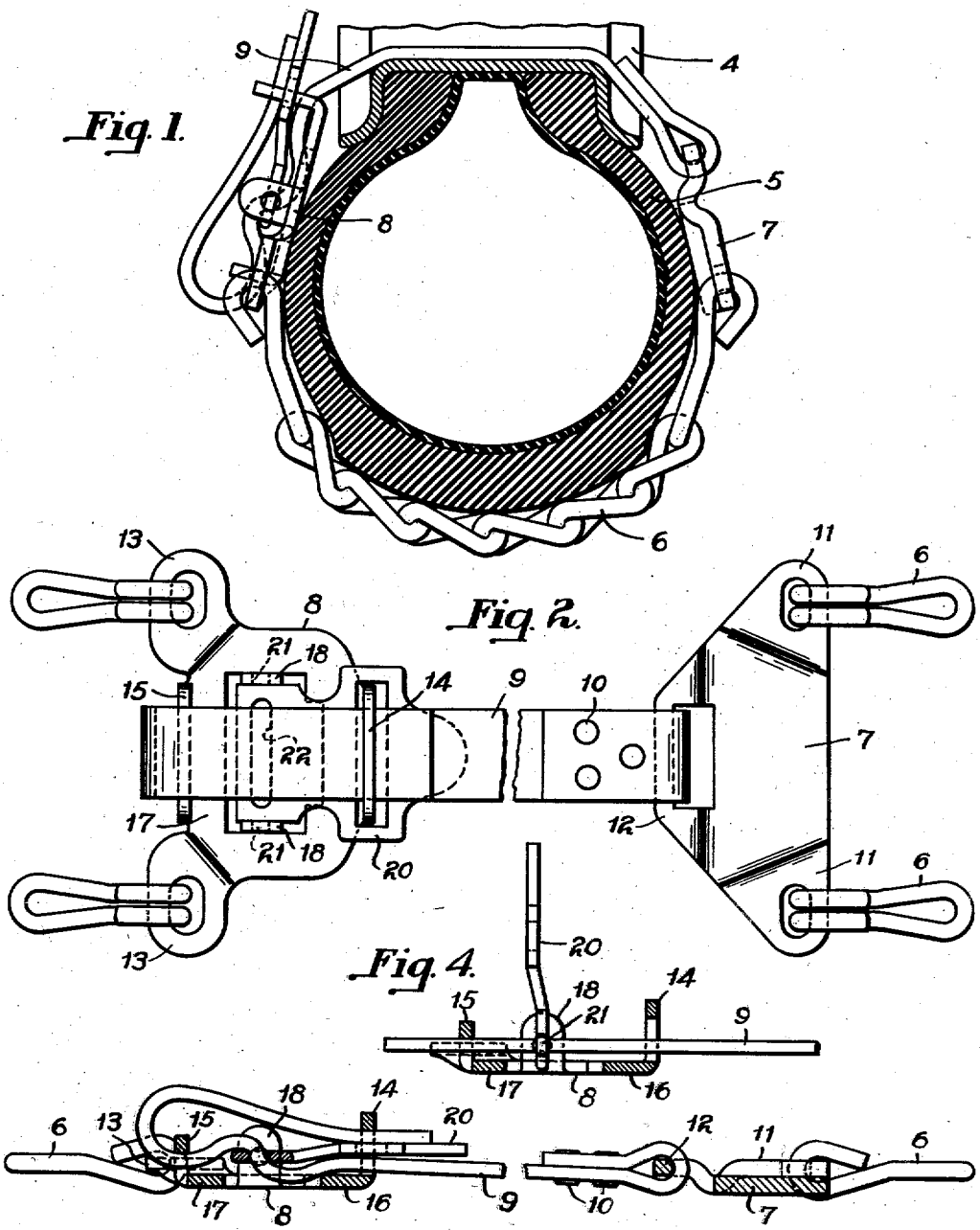

Patented Nov. 20, 1934

1,981,726

UNITED STATES PATENT OFFICE 1,981,726

TIRE CHAIN

Mervin Gentzler, York, Pa., assignor to The McKay Company, Pittsburgh, Pa., a corporation of Pennsylvania Application June 15, 1934, Serial No. 730,775

9 Claims. (Cl. 24—193)

My invention is herein described as employed more particularly in connection with its application to anti-skid chains for vehicle wheels, but it will be understood that various features of the invention are susceptible of use in various other ways.

One object of my invention is to provide a fastening device which includes a tie member or tension member of strap-like form that can be held under tension without danger of slipping or loosening.

Another object of my invention is to provide an improved gripping and tensioning device for holding a strap against slipping, without the necessity of weakening the strap by providing perforations in the strap or providing toothed members which bite into the strap.

Still another object of my invention is to provide a fastening device that may be conveniently employed to hold anti-skid chains on the treads of vehicle wheels at desired degrees of tension, and of such form that manipulation thereof is facilitated and can be easily and quickly connected and disconnected.

A further object of my invention is to provide a buckle of simplified and improved form for holding a strap, and which will not become ineffective through wear on the parts thereof and lessen its efficiency.

In the accompanying drawing, Figure 1 is a cross-sectional view of a portion of a vehicle wheel with my fastening device applied thereto; Fig. 2 is a plan view of a portion of the structure of Fig. 1; Fig. 3 is a longitudinal sectional view through the structure of Fig. 3; and Fig. 4 is a sectional view of the fastening device of Fig. 3, showing the manner of threading the strap therethrough.

A portion of a wheel rim 4 is shown that carries a tire 5 in the usual manner. Anti-skid cross chains 6 are disposed across the tread of the tire and these chains may be of any suitable form. Opposite ends of the chains are connected to a bar 7 and a buckle plate 8, respectively. It will be understood, of course, that the chains 6 need not be arranged in pairs, but that a single cross chain could be connected to bars corresponding to the bars 7 and 8, or that any number of cross chains could be so connected.

The chains are intended to function in the manner of any various known types of anti-skid chains, including those wherein a complete series of cross chains are connected at their ends to side chains that are disposed against the sides of the tire or the wheel rim. The present invention is shown as employed in connection with what is sometimes termed unit chains that consist of one or more cross chains, each one or each group of which is individually secured to the vehicle wheel, independently of the others, by separate fastening means, instead of all of the cross chains being connected to the usual annular side chains.

A strap 9 is looped at one end through the bar 7 and has the looped end fastened by rivets 10, or other suitable fastening means. The bar 7 has its ends raised above the plane of the central portion of the bar, as indicated at 11, to which the chains 6 are attached. Also, the intermediate strap receiving portion 12 of the bar 7 is bent to a plane above the plane of the central portion of the bar, so that the bar will have an extended area of engagement with the tire 5, thereby eliminating the danger of injury to the tire through abrasion. The buckle plate 8 is provided with laterally-extending and raised wing portions 13 to which the chains 6 are connected, to provide an extended area on contact between the plate and the tire.

The plate 8 is provided at its front and rear edges with upright transversely-extending flanges, each flange being punched or slotted to form cross bars 14 and 15 vertically spaced from the plane of the plate. The body portion of the plate is punched or cut out to form a central rectangular opening therein, thereby forming plate bars 16 and 17. In punching the body portion of the plate, sufficient material is left remaining at the lateral edges of the opening to form ears 18 which are bent upwardly. A lever plate 20 is positioned between the ears 18 and is provided adjacent to one end thereof with outwardly-extending pivot pins or trunnions 21 that extend through the ears 18 to pivotally connect the lever plate to the buckle plate. The lever plate is transversely slotted adjacent to its pivoted end, as indicated at 22, for passage of the strap 9 therethrough.

In connecting the bar 7 to the plate 8, the free end of the strap 9 is passed between the vertically-spaced bars 14 and 16, through the slot 22 in the lever plate 20 and between the vertically-spaced bars 15 and 17, as shown more clearly in Fig. 4. The strap 9 is then pulled through the plate 8 until the cross chains are properly positioned around the tire and under the desired degree of tension, although the tension may be such that the chains are applied loosely to the tire or may be drawn up into snug engagement with the tire. The lever plate 20 is then turned downwardly into substantial parallelism with the plane of the buckle plate, the lever plate being slotted to receive the bar 14 therethrough. The free end of the strap is then bent back upon itself into position to overlie the buckle plate and is threaded between the bar 14 and upper side of the lever plate 20. The lever plate is, of course, depressed sufficiently to facilitate passage of the strap beneath the bar 14. Upon release of the lever plate, the parts will lie in the position shown in Figs. 1 and 3.

When the lever plate 20 is moved or turned from its upright position, as shown in Fig. 4, to its horizontal position, as shown in Fig. 3, the strap 9 is twisted or bent into sinuous form, whereby any pull on the strap and the buckle plate will tend to flatten the strap and cause it to bind against the corners of the wall of the slot 22. Furthermore, the lever plate bends the strap at opposite sides of the axis of rotation into planes above and below the lower edge plane of the bar 15 and the upper edge plane of the bar 16, respectively, so that the lever plate 20 cooperates with the cross bars 15 and 16 to exert binding action on opposite sides of the strap and additionally hold the strap against sliding movement. Tension on the strap merely causes the strap to bind more firmly with its contacting cross bars.

The free end of the strap is passed between the bar 14 and the outer end of the lever plate 20 to serve as a keeper to prevent counter rotative movement of the lever 20, thereby dispensing with the need for a latch for maintaining the lever in its horizontal position. In addition, this construction assists in preventing slipping of the strap because counter-rotative force imposed on the crank end portion of the lever will result in the lever forcing the strap more firmly against the cross bar 14.

Even when the strap is not under tension in a longitudinal direction, as when the chains are applied loosely to the tire, the strap is actually clamped against slippage because of the tension in a perpendicuar direction which is imposed on the strap by the clamping lever 20. Likewise, wear and consequent looseness of the lever at its pivotal connection with the ears 18 does not affect the clamping action of the lever since the clamping of the strap is primarily dependent upon bending of the straps into sinuous form.

To release the strap, the lever 20 is depressed slightly, the end of the strap is pulled from between the bar 14 and the lever, whereupon the lever is released and automatically moves into approximately upright position and frees the strap. Complete disconnection of the strap and the buckle is effected by sliding movement of the one relative to the other. Even with the parts covered with mud or coated with particles of ice, the strap is easily released since it is moved into parallelism with the plane of the buckle plate by the lever 20 and a slight pull on the strap is effective to move the same. The strap is preferably made of waterproof material such as rubber, reinforced by fabric, and hence will not absorb water which could freeze and thereby prevent convenient manipulation of the strap.

The weight of the bar 7 and the parts of the buckle 8 is substantially equal so that when the cross-chain unit is properly applied to the vehicle wheel, it will not creep to present some portion of the buckle and the bar 7 under the tire. This balancing provision is especially needed when the unit is loosely or carelessly applied to the wheel.

I claim as my invention:—

1. A buckle comprising a plate having spaced upright flanges thereon, each flange having a transversely-extending slot, for passage of a strap therethrough, a lever pivotally mounted on said plate, means carried by said lever at a point radially offset from the axis thereof, for engaging the strap and bending the same between said flanges into sinuous form through movement of the lever into substantial parallelism with the plane of the plate, and means for holding said lever in said parallel position.

2. A buckle comprising a plate having spaced upright flanges thereon, each flange having a transversely-extending slot, for passage of a strap therethrough, a lever pivotally mounted on said plate, means on said lever for engaging the strap at opposite sides thereof at points adjacent to the axis of the lever and operable to bend the strap between said flanges into sinuous form through movement of the lever into substantial parallelism with the plane of the plate, and means for holding said lever in said parallel position.

3. A buckle for securing a strap, comprising a plate having a plurality of spaced cross bars disposed in a plane above the plane of the plate, and arranged so that the strap may extend across said plate and beneath said cross bars, and a lever plate pivotally mounted on the buckle plate between said cross bars, and having a transversely-extending slot therethrough, through which the strap may extend and be bent into sinuous form upon movement of said lever plate into substantial parallelism with the plane of said buckle plate.

4. A buckle for securing a strap, comprising a plate having a plurality of spaced cross bars disposed in a plane above the plane of the plate, and arranged so that the strap may extend across said plate and beneath said cross bars, and a lever plate pivotally mounted on the buckle plate between said cross bars, and having a transversely-extending slot therethrough, through which the strap may extend and be bent into sinuous form upon movement of said lever plate into substantial parallelism with the plane of said buckle plate, said lever plate having a slot for receiving one of said cross bars therethrough, the free end of said strap being bent back and passed between said one cross bar and said lever plate, for holding the said lever plate in said parallel position.

5. The combination with a buckle plate having spaced upright flanges thereon, of a lever plate pivotally mounted on the buckle plate, intermediate said flanges, each of said flanges and said lever plate having a transversely-extending slot, the slot in the lever plate being in alignment with the slot in said flanges with the lever in generally upright position, and arranged so that a strap may extend through said slots, said lever plate being movable into substantial parallelism with the plane of the buckle plate for bending the adjacent portion of the strap in opposite directions, and means for holding said lever plate in said parallel position.

6. The combination with a buckle plate having spaced upright flanges thereon, of a lever plate pivotally mounted on the buckle plate, intermediate said flanges, each of said flanges and said lever plate having a transversely-extending slot, the slot in the lever plate being disposed adjacent to the axis of the lever and in alignment with the slot in said flanges with the lever in generally upright position, and arranged so that a strap may extend through said slots, said lever plate being movable into substantial parallelism with the plane of the buckle plate for bending the adjacent portion of the strap in opposite directions, and means for holding said lever plate in said parallel position.

7. The combination with a buckle plate having spaced upright flanges thereon, of a lever plate pivotally mounted on the buckle plate, intermediate said flanges, each of said flanges and said lever plate having a transversely-extending slot, the slot in the lever plate being in alignment with the slot in said flanges with the lever in generally upright position, and arranged so that a strap may extend through said slots, said lever plate having an opening for receiving one of said flanges therethrough, and being movable into substantial parallelism with the plane of the buckle plate, for bending the adjacent portion of the strap in opposite directions, the free end of said strap being bent back to overlie said lever plate and inserted through the slot in said one flange, for holding the lever plate in said parallel position.

8. A buckle comprising a plate having a slot in each of two oppositely-disposed edges, through which a strap may extend, a lever pivotally mounted on the plate, at a point between the slots, means carried by the lever at a point radially offset from the axis thereof, for engaging the strap and bending the same to sinuous form, through turning of the lever, and means for locking the lever in its turned position.

9. A buckle comprising a plate having a slotted flange, and a lever pivotally mounted on the plate and having a strap-engaging portion arranged to grip a strap when the lever is turned toward parallelism with the plate, the slot of the said flange being so positioned that the end of the strap can be passed therethrough and overlie the free end of the lever to hold the lever and lock it in its gripping position.

MERVIN GENTZLER.

DISCLAIMER 1,981,726.—*Mervin Gentzler*, York, Pa. TIRE CHAIN. Patent dated November 20, 1934. Disclaimer filed October 2, 1937, by the assignee, *The McKay Company*.

Hereby enters its disclaimer to claim 9 of said patent.
[*Official Gazette November 9, 1937*.]

generally upright position, and arranged so that a strap may extend through said slots, said lever plate being movable into substantial parallelism with the plane of the buckle plate for bending the adjacent portion of the strap in opposite directions, and means for holding said lever plate in said parallel position.

7. The combination with a buckle plate having spaced upright flanges thereon, of a lever plate pivotally mounted on the buckle plate, intermediate said flanges, each of said flanges and said lever plate having a transversely-extending slot, the slot in the lever plate being in alignment with the slot in said flanges with the lever in generally upright position, and arranged so that a strap may extend through said slots, said lever plate having an opening for receiving one of said flanges therethrough, and being movable into substantial parallelism with the plane of the buckle plate, for bending the adjacent portion of the strap in opposite directions, the free end of said strap being bent back to overlie said lever plate and inserted through the slot in said one flange, for holding the lever plate in said parallel position.

8. A buckle comprising a plate having a slot in each of two oppositely-disposed edges, through which a strap may extend, a lever pivotally mounted on the plate, at a point between the slots, means carried by the lever at a point radially offset from the axis thereof, for engaging the strap and bending the same to sinuous form, through turning of the lever, and means for locking the lever in its turned position.

9. A buckle comprising a plate having a slotted flange, and a lever pivotally mounted on the plate and having a strap-engaging portion arranged to grip a strap when the lever is turned toward parallelism with the plate, the slot of the said flange being so positioned that the end of the strap can be passed therethrough and overlie the free end of the lever to hold the lever and lock it in its gripping position.

MERVIN GENTZLER.

DISCLAIMER 1,981,726.—*Mervin Gentzler*, York, Pa. TIRE CHAIN. Patent dated November 20, 1934. Disclaimer filed October 2, 1937, by the assignee, *The McKay Company*.

Hereby enters its disclaimer to claim 9 of said patent.

[*Official Gazette November 9, 1937.*]